(12) United States Patent
Segato

(10) Patent No.: US 7,918,500 B2
(45) Date of Patent: Apr. 5, 2011

(54) QUICK-MOUNT FRAME STRUCTURE, PARTICULARLY FOR BICYCLE SADDLES OR SIMILAR SUPPORTS, PROCESS OF MAKING SUCH STRUCTURE AND SADDLE INCORPORATING SAME

(75) Inventor: Stefano Segato, Vicenza (IT)

(73) Assignee: Selle Royal S.p.A., Pozzoleone (IT)

( * ) Notice: Subject to any disclaimer, the term of this patent is extended or adjusted under 35 U.S.C. 154(b) by 90 days.

(21) Appl. No.: 12/094,154

(22) PCT Filed: Dec. 1, 2006

(86) PCT No.: PCT/IB2006/054556
§ 371 (c)(1),
(2), (4) Date: May 18, 2008

(87) PCT Pub. No.: WO2007/063526
PCT Pub. Date: Jun. 7, 2007

(65) Prior Publication Data
US 2008/0303319 A1    Dec. 11, 2008

(30) Foreign Application Priority Data
Dec. 2, 2005 (IT) ................ VI2005A0321

(51) Int. Cl.
*B62J 1/00* (2006.01)
*B62J 1/08* (2006.01)

(52) U.S. Cl. .................. 297/215.16; 297/195.1
(58) Field of Classification Search ............ 297/195.1, 297/215.16
See application file for complete search history.

(56) References Cited

U.S. PATENT DOCUMENTS

| 4,098,537 | A | * | 7/1978 | Jacobs | .............. 297/215.16 |
| 4,367,896 | A | | 1/1983 | Nieddu | |
| 5,387,024 | A | * | 2/1995 | Bigolin | ........... 297/215.16 X |
| 5,636,896 | A | * | 6/1997 | Howard | ............ 297/215.16 |
| 5,927,802 | A | | 7/1999 | Kesinger | |
| 2004/0004375 | A1 | | 1/2004 | Garland | |

FOREIGN PATENT DOCUMENTS
FR    2513586    4/1983
WO    9425331    11/1994

* cited by examiner

*Primary Examiner* — Anthony D Barfield
(74) *Attorney, Agent, or Firm* — Themis Law

(57) ABSTRACT

A quick-mount frame structure, particularly for bicycle saddles and similar supports. The structure comprises at least one shell (2) having a top user-supporting surface (6) and a bottom surface (7), said shell (2) having a front portion (8) and a rear portion (9), saddle rails (3) for attachment of said shell (2) to a movable or stationary support, said rails (3) having an outer peripheral edge (10) and means for stable connection between said rails (3) and said shell (2). The connection means include snap engagement means (11) at least at one of said front (8) and rear (9) portions of said shell (2) for quick connection between the shell (2) and the rails (3). A process for making the above structure, and a saddle incorporating such structure.

16 Claims, 3 Drawing Sheets

QUICK-MOUNT FRAME STRUCTURE, PARTICULARLY FOR BICYCLE SADDLES OR SIMILAR SUPPORTS, PROCESS OF MAKING SUCH STRUCTURE AND SADDLE INCORPORATING SAME

FIELD OF THE INVENTION

The present invention finds application in the field of sport and leisure accessories and particularly relates to a quick-mount frame structure, e.g. for bicycle saddles or movable or stationary pedal-operated machines, as well as to a process of making such frame structure.

The invention further relates to a saddle incorporating the above frame structure.

BACKGROUND OF THE INVENTION

Saddles, particularly for bicycles or pedal-operated machines in general, are known to be connected to the support by means of a relatively rigid but elastic saddle frame, formed of a metal or composite material, commonly known as "rails".

Saddle rails are further known to generally comprise one or more specially shaped elongate elements, each having a middle portion designed to be mounted to the underlying support and an end portion, partly convergent and partly divergent, designed for connection with the saddle or its shell or supporting core.

The rails typically comprise a pair of elongate members, which are connected to the saddle by coupling respective end portions into special receptacles on the bottom surface of the saddle or its shell.

This prior art solution has a few apparent drawbacks.

First, this kind of fit coupling to loosen and to become rather instable with time and extensive use.

Furthermore, when using this kind of coupling, pressure between the rails and the saddle is exerted on a few small areas, thereby involving high stress concentration.

The receptacles for the ends of the rails are rather large and increase the size of the saddle, thereby adding weight to the bicycle and reducing cyclists' performances, especially during competitions and extreme sport activity.

This saddle/rails fit is known to require a saddle pre-tensioning step, during which the shell is curved or widened to temporarily increase the distance between the receptacles to a sufficient extent as to allow the rails to be accommodated therein.

Once the rails have been mounted, the saddle is released, with the shell assuming its initial configuration, while the receptacles engage the ends of the rails.

These steps require appropriate equipment and arrangements, which have to be adapted and calibrated for each saddle model and shell and saddle base material. Adjustments have to be particularly accurate when using frames of composite materials, because the smallest calibration error might cause considerable stresses, which might affect shell integrity with time.

SUMMARY OF THE INVENTION

The main object of this invention is to overcome the above drawbacks, by providing a frame structure having high efficiency, durability and cost-effectiveness.

A particular object is to provide a frame structure in which the rails/shell connection is particularly easy and stable.

A further object is to provide a frame structure whose light weight and small size make it particularly suitable for competitions.

Another object is to provide a frame structure that allows an optimized distribution of stresses generated by user pressure on the structure.

Yet another object of the invention is to provide a process for making a frame structure, that does not cause excessive mechanical stresses on the shell during connection thereof to the rails.

Another object of the invention is to provide a saddle that uses the above frame structure.

These and other objects, as better explained hereafter, are fulfilled by a frame structure which, in accordance with claim 1, comprises at least one shell having a top user-supporting surface and a bottom surface, said shell having a front portion and a rear portion; saddle rails designed for connection of said shell to a movable or stationary support, said rails having an outer peripheral edge and means for stable connection between said rails and said shell, characterized in that said connection means comprise snap engagement means at least at one of said front and rear portions of said shell.

Thanks to this particular configuration, the frame structure of the invention allows quick and easy connection between the shell and the rails, for maximized assembly simplicity.

Furthermore, since there is no need to provide receptacles on the shell, the frame structure has a very light weight and a small size, and does not restrict cyclist's performances, whereby it is particularly suitable for competitions.

It will be appreciated that the snap engagement means may be either incorporated in the shell and/or the rails, or associated to any portion of the rails and/or the shell.

Advantageously, the snap engagement means may include at least one element that projects downwards from the bottom surface of the shell for interaction with the outer peripheral edge of the rails.

As an illustrative, non-limiting example, such projecting member may comprise a certain number of fins substantially vertically projecting in any position from the bottom surface of the shell.

These fins may be made of a flexible plastic or metal material, which allows them to bend upon insertion of the rails, and to snap into the original configuration, to engage the outer or inner edge of the rails, or into a receptacle specially formed thereon.

For this purpose, the fins may have a substantially straight shape and/or an inward or outward concavity for receiving the rails edge.

Alternatively, the projecting member may include one or more fastening edges substantially vertical projecting in any position from the bottom surface of the shell. The above considerations regarding materials and configuration also apply to the edge of the latter embodiment.

Conveniently, each projecting member may be formed at least partly of an outer peripheral edge of the shell. Furthermore, the rails may comprise a substantially rigid body having a substantially annular continuous shape.

The rails may be of the open or closed ring type, and have an either monolithic or composite construction.

Thanks to this particular configuration, the frame structure of the invention allows optimized distribution of the stresses exerted by the user on the top surface of the shell, while avoiding pressure peaks at the ischial regions of his/her body. By this configuration of the rails, the rails-shell contact points will be moved from the inside to the periphery of the shell, thereby utilizing all the elasticity thereof. Optionally, at least one layer of adhesive may be interposed between the contact surfaces of the shell and the rails, to provide a particularly stable and effective connection therebetween.

In another aspect, the invention provides a saddle as defined in claim 16, which comprises a bearing structure designed to contact a user's body, characterized in that it comprises the above frame structure, in which the bearing structure is associated to the shell.

In yet another aspect, the invention provides a process for making a frame structure which, as defined in claim 17, is characterized in that it comprises the following steps: providing at least one shell having a bottom surface and a top user-supporting surface, said shell having a front portion and a rear portion; providing saddle rails to be secured to the bottom surface of said shell, said rails having an outer peripheral edge; forming means for stable connection between said rails and said shell, which comprise snap engagement means; connecting said rails to said shell by snap engagement at least at one of said front and rear portions of said shell to allow quick connection thereof.

BRIEF DESCRIPTION OF THE DRAWINGS

Further features and advantages of the invention will be more apparent from the detailed description of a preferred, non-exclusive embodiment of a frame structure according to the invention, which is described as a non-limiting example with the help of the annexed drawings, in which.

DETAILED DESCRIPTION OF A PREFERRED EMBODIMENT

Referring to the above figures, the frame structure of the invention, generally designated by numeral 1, may be used to connect a human body support to a lower support, not shown.

In the illustrated embodiment, the human body support is a saddle for a bicycle or a pedal-operated machine, whereas the support may be movable, such as a bicycle or motorcycle frame, or stationary, such as an exercise bicycle frame.

Figure 1:
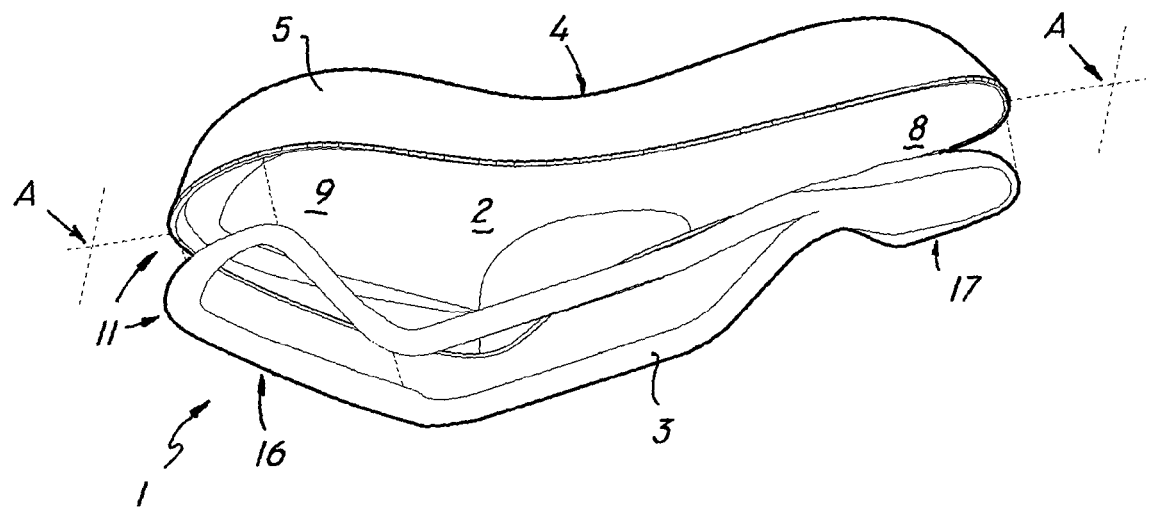
FIG. 1 is an exploded perspective view of a saddle comprising the frame structure according to the invention.

As shown in FIG. 1, the frame structure 1 may comprise a shell 2 and saddle rails 3.

The shell 2 may have a top surface 4 designed to contact a user's body. This surface 4 may be the top face of a layer 5 of resilient material, such as foam, rubber, gel or the like. A protective layer, e.g. made of leather, imitation leather, plastic, waterproofed material, Lycra® or the like, may be provided thereon.

Figure 5:
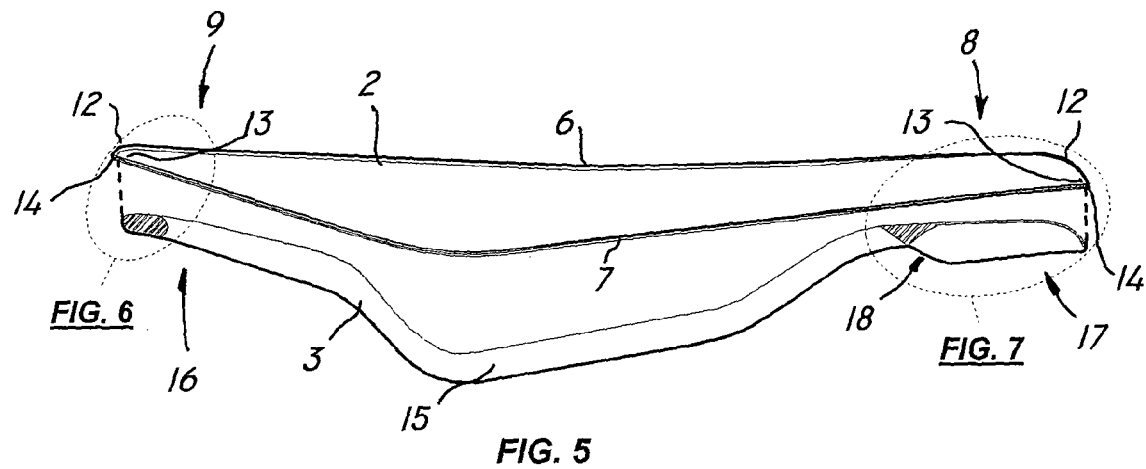
FIG. 5 is an exploded plan view of the structure of the invention, as taken along the plane A-A.

As shown in FIG. 5, the shell 2 may be formed of a rigid or semirigid and elastically deformable material, selected from natural, synthetic and preferably composite materials.

The shell 2 may have a top surface 6 facing a user's body and a bottom surface 7 for connection to the rails 3.

Figure 3:
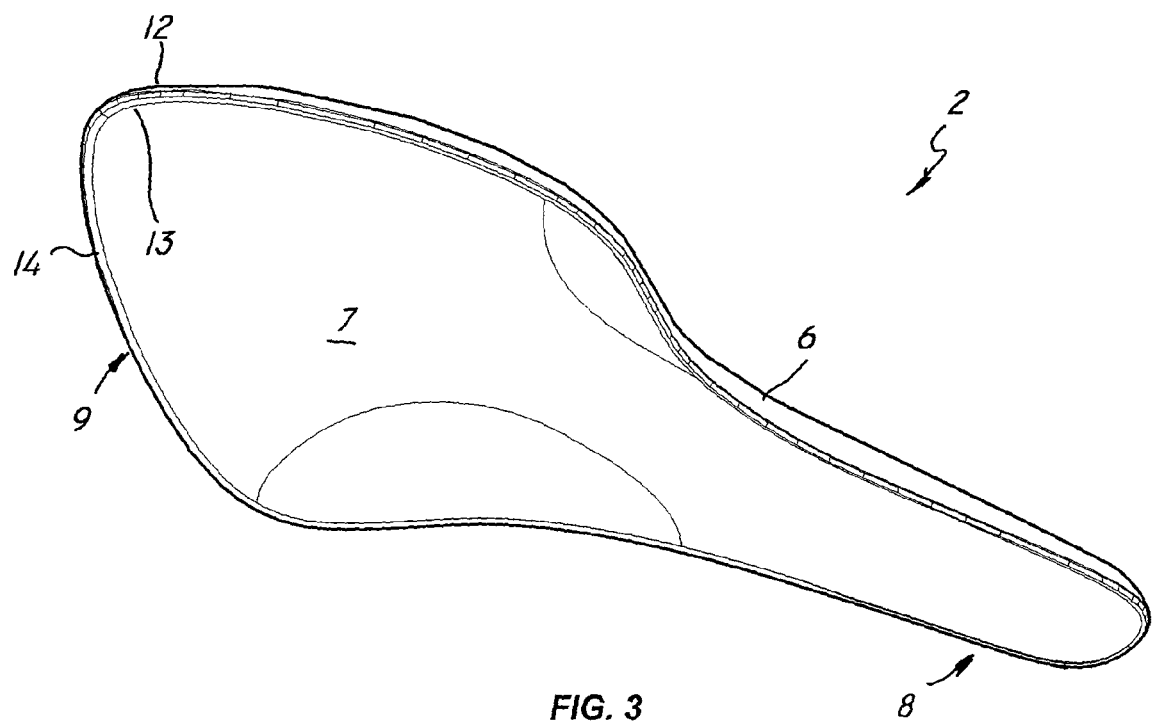
FIG. 3 is a perspective view of the shell of the structure according to the invention.

As also shown in FIG. 3, the shell 2 may have an elongate front portion 8 and a widened rear portion 9.

Figure 2:
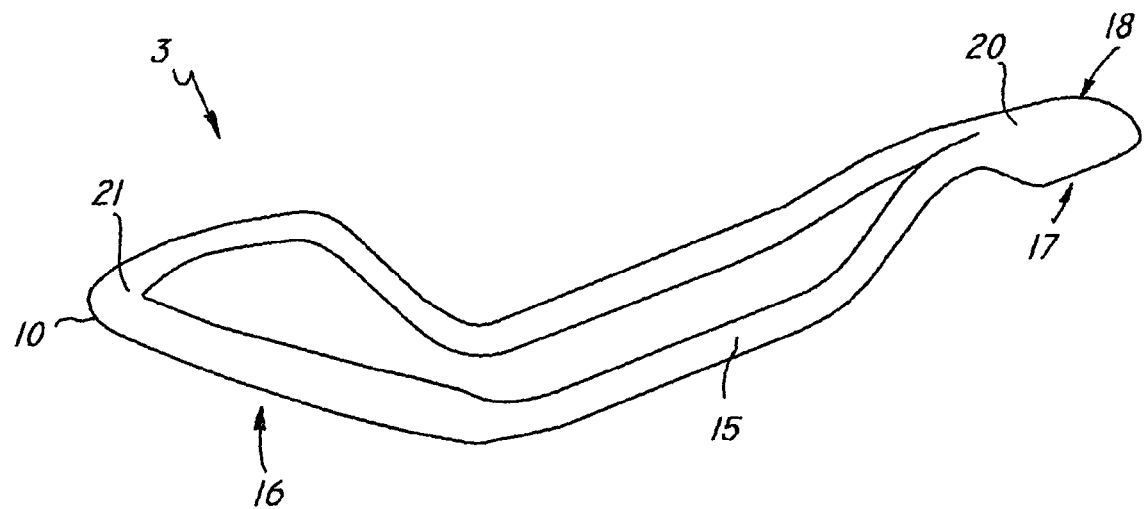
FIG. 2 is a perspective view of the rails of the structure according to the invention.

The rails 3 for securing the shell 2 to the bicycle frame 2 may have an outer peripheral edge 10, as shown in FIG. 2.

Means may be further provided for stable connection between the rails 3 and the shell 2, including snap engagement means, generally designated by numeral 11.

These may include an outer peripheral edge 12 of the shell 2, which is designed to interact with the outer peripheral edge 10 of the rails 3.

Figure 4:
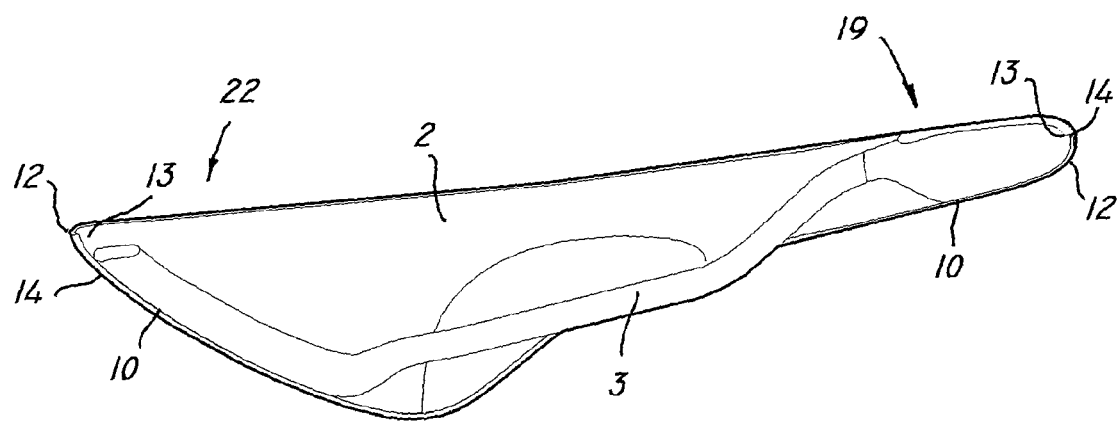
FIG. 4 is a perspective view of the structure of the invention, as taken along a plane A-A.

For this purpose, as best shown in FIGS. 4 and 5, the outer peripheral edge 12 may have an inner concave surface 13 defining a receptacle for the outer peripheral edge 10 of the rails 3, having an undercut 14 with respect to the latter.

FIG. 2 shows a preferred non-exclusive embodiment of the rails 3, which may consist of a substantially cylindrical rigid body 15 having a continuous annular shape, with a widened rear portion 16 and a tapered front portion 17. As shown in the Figures, the widened portion 16 of the rails 3 may snap into the corresponding widened portion 9 of the shell 2, and the tapered portion 17 of the rails 3 may snap into the corresponding tapered portion 8 of the shell 2.

The latter may include a bulb-shaped end 18, which is substantially complementary to the corresponding area 19 of the bottom surface 7 of the shell 2.

Preferably, but without limitation, the body 15 may be made from a composite material reinforced with fibers selected from Kevlar, glass fiber, carbon fiber or long chain polyethylene (DYNEEMA©).

Figure 6:
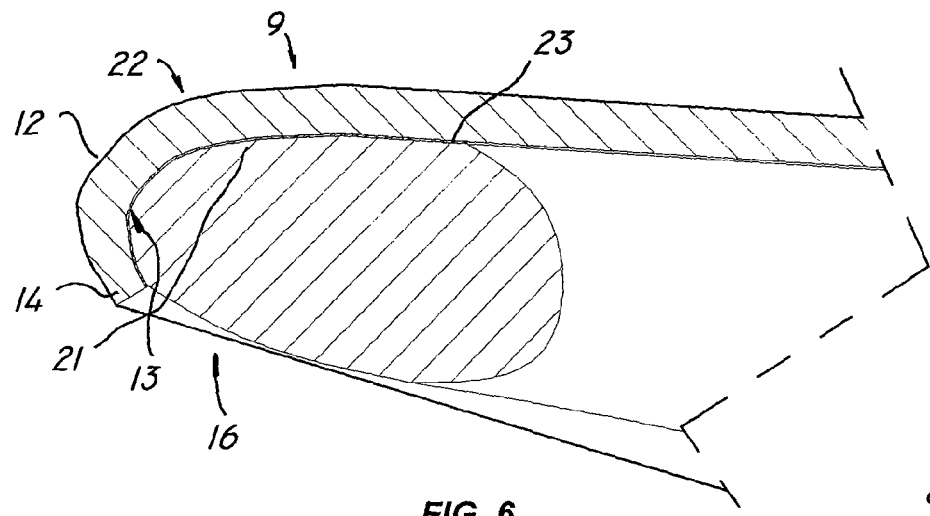
FIGS. 6 and 7 are enlarged views of a few details of FIG. 5.
Figure 7:
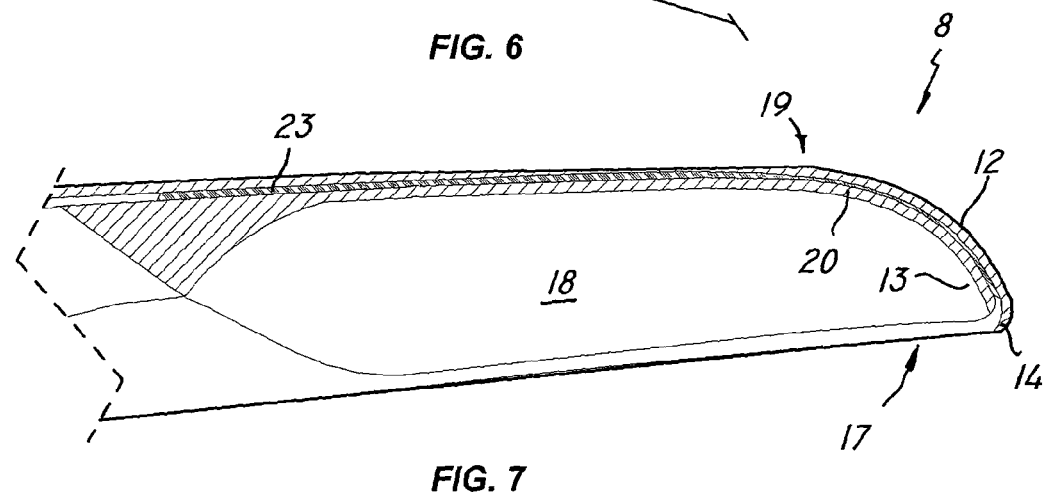

As best shown in FIGS. 6 and 7, the rails may have front and rear bearing surfaces 20 and 21, which are designed to at least partly contact the bottom surface 7 of the shell 2, and whose shape is substantially complementary to that of the corresponding areas 19 and 22 of the bottom surface 7 of the shell 2, for perfect direct contact therewith.

Furthermore, for a more stable connection between the rails and the shell, a layer of adhesive may be interposed therebetween, designated with numeral 23 in FIGS. 6 and 7.

The above frame structure may be fabricated using a process that includes at least the following steps.

Once the shell 2 and the rails 3 have been formed, possibly by separate processes and at different times, means for stable rails/shell connection, including the snap engagement means 11, may be formed at the bottom surface 7 of the shell 2.

This step may be followed by a connection step, in which the rails 3 are snap engaged with the shell 2, possibly preceded by a bonding step, in which a layer of adhesive 23 is interposed therebetween.

In order to prevent any undesired disengagement between the rails 3 and the shell 2, a step may be provided in which an undercut 14 with respect to the outer peripheral edge 10 of the rails 3 is formed in the shell 2.

Thanks to the provision of the snap engagement means, the process of the invention allows to omit the shell pre-tensioning step, which is needed in prior art processes.

The above disclosure clearly shows that the structure of the invention fulfills the intended objects and particularly meets the requirement of providing a frame structure whose rails-shell connection is particularly easy and stable.

The provision of the snap means 11 affords a particularly easy and quick connection of the rails 3 to the shell 2. Also, the structure of the invention has a light weight and a compact size, which make it particularly suitable for making competition saddles.

Such structure may be further formed without providing a forced frame pretensioning step, which is typically required in prior art, wherefore the frame will not be subjected to any stress. The process of the invention will reduce such step to a slight deformation of the shell 2, to "open" the snap means 11 and allow connection thereof to the rails 3. This slight pretensioning step is limited to the assembly process, whereby no pretensioning occurs during normal use of the structure 1.

The structure of the invention is susceptible of a number of modifications and changes all falling within the scope of the invention defined in the appended claims. All the details thereof may be replaced by other technically equivalent parts, and the materials may vary depending on different needs, without departure from the scope of the invention.

While the structure has been described with particular reference to the accompanying figures, the numerals referred to in the disclosure and claims are only used for the sake of a better intelligibility of the invention and shall not be intended to limit the claimed scope in any manner.

The instant application is based upon and claims priority of patent application no. VI2005A000321, filed on Feb. 12, 2005 in Italy, the disclosure of which is hereby expressly incorporated here in reference thereto.

The invention claimed is:

1. A quick-mount frame structure comprising:
at least one shell of elastically deformable material having a top user-supporting surface and a bottom surface, said shell having a front portion and a rear portion with corresponding first outer peripheral edges;
saddle rails for attachment of said shell to a movable or stationary support, said rails having a second outer peripheral edge and comprising a substantially rigid body with a substantially annular continuous shape;
means for stable connection between said rails and said shell, said connection means including snap engagement means at least at one of said front and said rear portions of said shell for quick connection between the shell and the rails,
wherein said snap engagement means are formed on both said front and said rear portion of said shell, said snap engagement means comprising at least one portion of said first outer peripheral edges of said shell that project downwards from said bottom surface at the longitudinal front and rear ends of said shell and that are at least partly undercut with respect to said second outer peripheral edge of said rails by a sufficient amount to form inner concave surfaces, such to allow easy assembly of said shell and said rails by snapping said snap engagement means over at least a portion of said saddle rails.

2. The structure as claimed in claim 1, wherein said substantially annular rails are of the open or closed ring type.

3. The structure as claimed in claim 1, wherein said rails have an either monolithic or composite construction.

4. The structure as claimed in claim 1, wherein said annular body has a widened rear portion and a tapered front portion.

5. The structure as claimed in claim 4, wherein said tapered front portion has a substantially bulb-shaped end whose shape is substantially complementary to that of the corresponding area of the bottom surface of said shell.

6. The structure as claimed in claim 1, wherein said annular body has a substantially cylindrical structure.

7. The structure as claimed in claim 1, wherein said body is made from a composite material reinforced with fibers selected from the group consisting of Kevlar, glass fiber, and carbon fiber.

8. The structure as claimed in claim 1, wherein said outer peripheral edge has an inner concave surface defining a receptacle for the outer peripheral edge of said rails.

9. The structure as claimed in claim 1, wherein said rails have at least one front or rear bearing surface configured to at least partly contact the bottom surface of said shell.

10. The structure as claimed in claim 9, wherein said bearing surfaces have a shape that is substantially complementary to the corresponding areas of the bottom surface of said shell for direct contact therebetween.

11. The structure as claimed in claim 1, wherein said elastically deformable material forming said shell is selected from the group consisting of natural, synthetic, or composite materials.

12. The structure as claimed in claim 1, wherein at least one layer of adhesive is interposed between the contact surfaces of said shell and said rails.

13. A human body support comprising:
a bearing structure susceptible to contact a user's body, wherein said bearing structure comprises the frame structure claimed in claim 1, said bearing structure being associated to said shell.

14. A process for making the frame structure claimed in claim 1, comprising the steps of:
providing at least one shell of elastically deformable material having a bottom surface and a top user-supporting surface, said shell having a front portion and a rear portion with corresponding first outer peripheral edges having inner concave surfaces;
providing saddle rails for attachment of said shell to the bottom surface thereof, said rails having a second outer peripheral edge and comprising a substantially rigid body having a substantially annular continuous shape;
forming means for stable connection between said rails and said shell including snap engagement means for interaction with said second outer peripheral edge of said rails;
quick connecting said rails and said shell by snap engagement at least at one of said front and rear portions of said shell;
wherein said snap engagement means are formed at both said front and said rear portion of said shell and are configured to provide at said first outer peripheral edges thereof at least one portion that projects downwards from said bottom surface at the longitudinal front and rear ends of said shell, said at least one downwardly projecting portion being so partly undercut with respect to said second outer peripheral edge of said rails to allow slight deformation of said shell to open said snap engagement means and to provide easy assembly of said shell and said rails by snapping said snap engagement means over at least a portion of said saddle rails.

15. The process as claimed in claim 14, wherein said step of connecting said rails and said shell comprises a step in which the rails and the shell are bonded by at least one layer of adhesive.

16. The process as claimed in claim 14, further comprising the step of forming an undercut with respect to the outer peripheral edge of said rails for preventing any accidental disengagement of said rails from said shell.

* * * * *